(12) United States Patent
Pandey et al.

(10) Patent No.: US 12,327,555 B2
(45) Date of Patent: Jun. 10, 2025

(54) SYSTEMS, METHODS, AND DEVICES FOR STAGED WAKEUP WORD DETECTION

(71) Applicant: Cypress Semiconductor Corporation, San Jose, CA (US)

(72) Inventors: Ashutosh Pandey, Irvine, CA (US); Rodolfo Gondim Lossio, Taipei (TW); Victor Simileysky, San Jose, CA (US); Robert Zopf, Rancho Santa Margarita, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 290 days.

(21) Appl. No.: 17/820,822

(22) Filed: Aug. 18, 2022

(65) Prior Publication Data

US 2024/0062756 A1 Feb. 22, 2024

(51) Int. Cl.
*G06F 40/30* (2020.01)
*G06F 1/3206* (2019.01)
*G10L 15/22* (2006.01)
*G10L 15/08* (2006.01)

(52) U.S. Cl.
CPC ............. *G10L 15/22* (2013.01); *G06F 1/3206* (2013.01); *G10L 2015/088* (2013.01); *G10L 2015/223* (2013.01)

(58) Field of Classification Search
None
See application file for complete search history.

(56) References Cited

U.S. PATENT DOCUMENTS

2015/0134331 A1\* 5/2015 Millet .................. G06F 1/3287
704/243

FOREIGN PATENT DOCUMENTS

| CN | 104035743 A | \* | 9/2014 | ........... G06F 1/3206 |
| CN | 105144023 A | \* | 12/2015 | ............. G06F 3/167 |
| CN | 114175681 A | \* | 3/2022 | ............. G01R 19/02 |

\* cited by examiner

*Primary Examiner* — Shreyans A Patel (57) ABSTRACT

Systems, methods, and devices detect audio signals. Methods may include receiving an audio input at an audio front end circuit, starting, using a low power circuit, one or more buffers in response to receiving the audio input, and identifying, using the low power circuit, speech included in the audio input. Methods may also include identifying, using the low power circuit and a high performance circuit, a wake word based, at least in part, on the identified speech, the high performance circuit being configured to verify the wake word identified by the low power circuit.

20 Claims, 5 Drawing Sheets

SYSTEMS, METHODS, AND DEVICES FOR STAGED WAKEUP WORD DETECTION

TECHNICAL FIELD

This disclosure generally relates to electronic devices, and more specifically, to audio signal detection performed by such electronic devices.

BACKGROUND

Audio and voice control capabilities may be applied in systems and devices in a variety of contexts, such as smart devices and smart appliances. Such smart devices may include smart assistants, also referred to as virtual assistants, that are configured to respond to voice commands. For example, a user may provide a specific phrase that may trigger activation of the smart device. Such a phrase may include one or more specific wake words that wake the smart device, and may cause the smart to device to perform one or more operations. Conventional techniques for processing such wake words remain limited because they are limited in their ability to identify such wake words in a power efficient manner.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Systems and devices may be configured to implement voice control functionalities for a variety of purposes, such as for smart devices and smart appliances. For example, smart devices may include smart assistants, also referred to as virtual assistants, that are configured to respond to voice commands. For example, a smart device may be in a dormant state and may be in a sleep mode. In response to detecting a particular auditory input, which may be a particular word, the smart device may wake and listen for a command or a query. Conventional techniques for identifying such voice inputs and commands are limited because they utilize components having high power consumption characteristics and may also include techniques that involve the insecure transmission of data. For example, conventional techniques may use cloud-based resources for verification operations.

Embodiments disclosed herein provide audio signal detection techniques having reduced power consumption and increased accuracy in wake word detection. As will be discussed in greater detail below, components underlying such audio signal detection may be split among a low power domain and a high performance domain to reduce power consumption associated with high performance components. Furthermore, the operation and configuration of buffers used to buffer received audio data may also be configured to achieve a particular profile. For example, buffers may be configured to implement a low power management profile that provides a low power consumption, or may be configured to implement a performance profile that provides a low latency. In some embodiments, such a profile may be selectable and configurable by the user.

Figure 1:
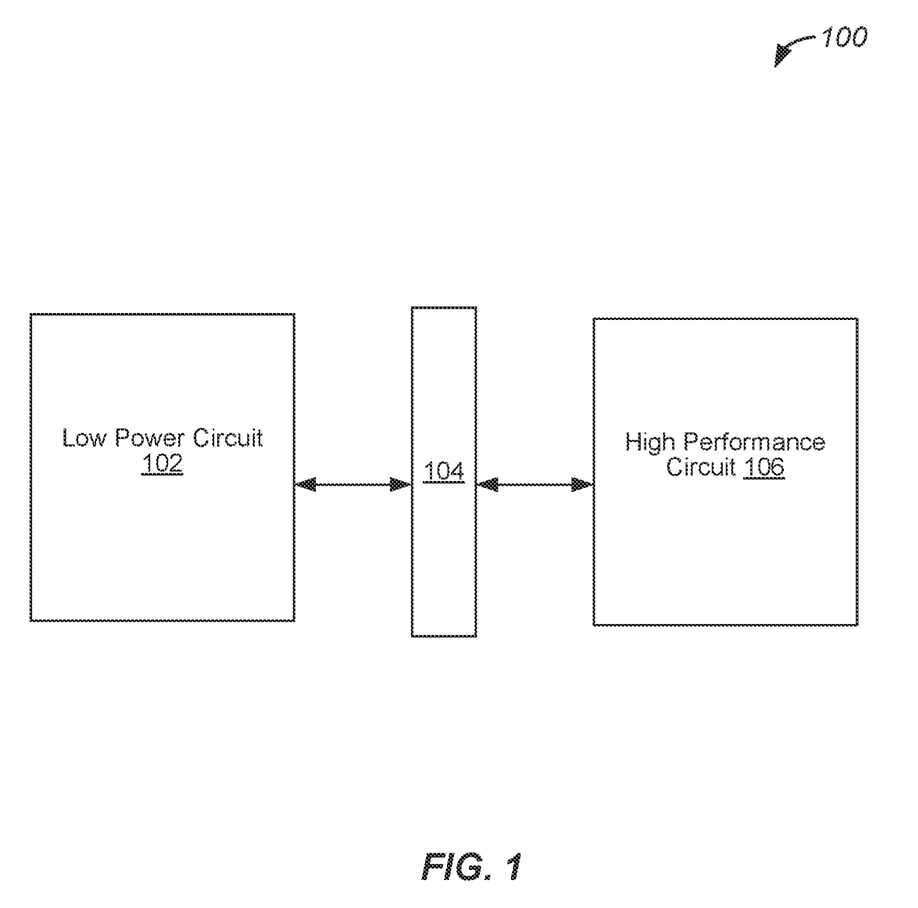
FIG. 1 illustrates a diagram of an example of a device for audio signal detection, configured in accordance with some embodiments.

FIG. 1 illustrates a diagram of an example of a device for audio signal detection, configured in accordance with some embodiments. As will be discussed in greater detail below, a device, such as device 100, may be configured to perform audio signal detection operations, as may be included in wake word detection used by various appliances and devices, such as smart home devices. For example, device 100 may be included in a microcontroller unit (MCU) that may be included in a smart device that may be configured to implement a smart assistant. As discussed above, such a smart assistant may respond to a wake word or a combination of wake words such as "okay" or the name of the smart assistant. As will be discussed in greater detail below, operations associated with such wake word detection may be split between low power components and high performance components to increase the efficiency of the operation of such devices.

In various embodiments, device 100 includes low power circuit 102 that may be implemented using low power circuitry. In various embodiments, low power circuit 102 has a first power level configured for low power operation. Accordingly, as will be discussed in greater detail below, low power circuit 102 may include one or more processors configured to operate at the first power level. In various embodiments, low power circuit 102 is configured based on reduced design complexity and reduced resource usage. For example, low power circuit 102 may include a staged energy-based activity detection, relative to noise-floor based speech-onset detection and low-complexity pattern recognition operating in a low-dimensional feature space. As will be discussed in greater detail below, such pattern recognition is implemented using a prediction model, which may be a supervised machine learning model. For example, the supervised machine learning model may be implemented using a neural network and/or other machine learning techniques such as decision trees.

As will be discussed in greater detail below, low power circuit 102 may include processing elements and memory configured to perform wake word detection operations that include operations such as detection of acoustic activity, detection of speech, and detection and identification of a wake word. It will be appreciated that operations, such as acoustic activity detection may be performed in other components as well, such as an audio front end discussed in greater detail below. Once the wake word has been detected, operations may be handed off to high performance circuit 106 for subsequent verification and query handling, as will be discussed in greater detail below. Accordingly, the management and handling of different wake word detection operations by different components of device 100 increases the overall power efficiency of device 100.

Device 100 may further include high performance circuit 106 that may include processing elements and memory configured to perform verification operations and query processing operations. In various embodiments, high performance circuit 106 has a second power level configured for high performance operation. Accordingly, as will be discussed in greater detail below, high performance circuit 106 may include one or more processors configured to operate at the second power level. Moreover, the second power level may be higher than the first power level.

In various embodiments, high performance circuit 106 may be configured to verify the wake word detection and identification performed by low power circuit 102, and may be further configured to handle a subsequent query or command issued by a user. Such a query or command may be a user input such as "turn off living room lights" or "what is the time now". Such a query or command may be received as an audio signal after the wake word. As will be discussed in greater detail below, such verification and query/command processing may be implemented using speech recognition components of high performance circuit 106.

As shown in FIG. 1, low power circuit 102 and high performance circuit 106 may be communicatively coupled to each other via interface 104. Accordingly, interface 104 may be configured to provide bidirectional communication between the two domains. In one example, interface 104 is an interface between a first chip used to implement low power circuit 102 and a second chip used to implement high performance circuit 106. As disclosed herein low power circuit 102 may be implemented via a first processor, and high performance circuit 106 may be implemented via a second processor, where the first processor and second processor are different processor cores implemented on a same chip. In such embodiments, synchronization and messages between processors may be handled by interface 104 which may be an inter-processor communication (IPC) interface. In various embodiments, interface 104 may include a circular buffer as part of a shared bus accessible by both low power circuit 102 and high performance circuit 106. An IPC interface may be used to avoid access conflicts to the circular buffer.

Figure 2:
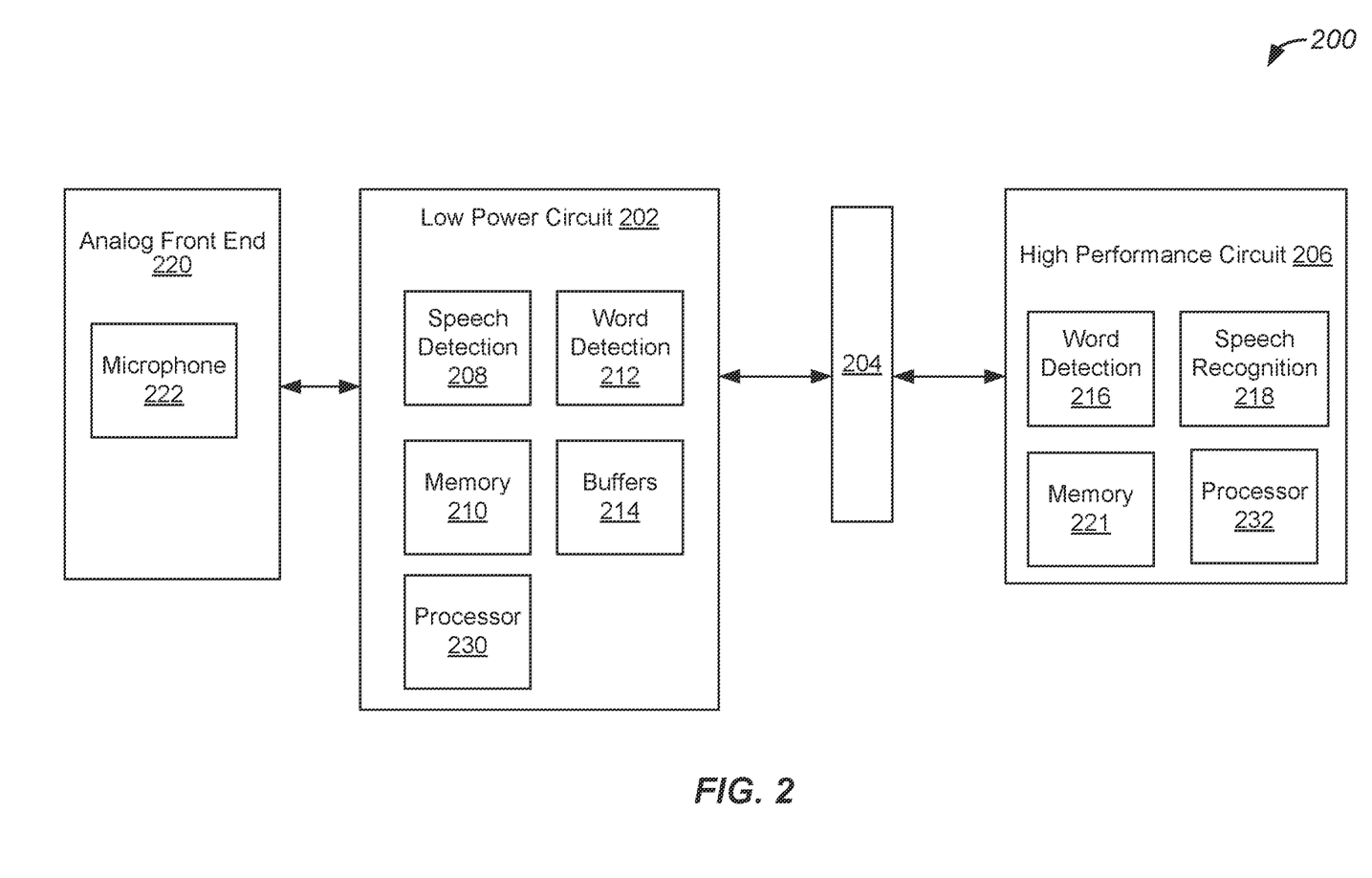
FIG. 2 illustrates a diagram of an example of a system for audio signal detection, configured in accordance with some embodiments.

FIG. 2 illustrates a diagram of an example of a system for audio signal detection, configured in accordance with some embodiments. As similarly discussed above, a system, such as system 200, may be configured to perform audio signal detection operations, as may be included in wake word detection used by various appliances and devices, such as smart home devices. For example, system 200 may include an audio front end as well as various components implemented in a low power circuit and a high performance circuit.

In various embodiments, system 200 includes audio front end 220 which may include various components configured to receive audio signals. For example, audio front end 220 may include one or more microphones, such as microphone 222. Audio front end 220 may also include analog components, such as amplifiers, as well as associated digital components, such as an analog-to-digital converter and a first-in-first-out (FIFO) register. In some embodiments, components of audio front end 220, such as microphones, may be configured to operate in low power consumption states until a designated threshold of acoustic activity is detected. In various embodiments, the analog components may also include one or more low-power analog comparators and digital counters for acoustic activity detection.

Accordingly, audio front end 220 is configured to receive audio signals from an environment in which system 200 is implemented, and is further configured to convert such audio signals into a stream of digital data. As similarly discussed above, such audio signals may include voice or audio commands from a user. Accordingly, speech from a user may be detected via microphone 222 and audio front end 220 may be configured to monitor acoustic signals and dynamically compute and potentially readjust an activation threshold of an audio signal that triggers a speech detection model, as will be discussed in greater detail below.

In various embodiments, system 200 includes low power circuit 202 that may be implemented using low power circuitry. As similarly discussed above, low power circuit 202 may include one or more components configured to perform wake word detection operations that include operations such as detection of acoustic activity, detection of speech, and detection and identification of a wake word. For example, low power circuit 202 may include speech detection module 208 that is configured to detect the presence of speech within a received audio signal. Accordingly, speech detection module 208 is configured to distinguish between ambient sounds and a user's speech.

In various embodiments, speech onset detection is performed by tracking a noise floor through minimum statistics and/or monitoring short term energy evolution. Speech detection module 208 may include a peak energy detector may be configured to track an instantaneous energy against the noise floor to identify speech onset. It will be appreciated that speech detection module 208 may be configured to use any of the speech onset detection algorithms or techniques known to those of ordinary skill in the art. In some embodiments, upon detecting a speech onset event, speech onset detection module 208 asserts a status signal to first word detection model 212. In various embodiments, during detection operations, the stages are monitored through a state machine where detection progresses through designated states, and may also be implemented with a time-out operation if a designated amount of time elapses.

As will be discussed in greater detail below, speech detection module 208 may be configured to obtain a plurality of samples, and store such samples in a buffer, such as one of buffers 214. As will be discussed in greater detail below, the buffer may be a pulse-code modulation (PCM) buffer, and such a PCM buffer may have a size configured based on a size of a wake word. In various embodiments, speech detection module 208 is implemented via software. Accordingly, speech detection module 208 may be implemented using one or more processors included in low power circuit 202, such as processor 230, as well as a memory, such as memory 210 discussed in greater detail below. In another example, speech detection module 208 may be implemented using a dedicated hardware accelerator included in low power circuit 202.

Low power circuit 202 may include first word detection module 212 which is configured to perform a first stage of word detection performed by system 200. Accordingly, first word detection module 212 may be implemented using a dedicated hardware accelerator and may perform an initial word detection operation based on a comparison of the received audio data to that of one or more stored wake words. In this way, first word detection module 212 may compare received audio data to a stored designated audio pattern corresponding to a wake word, and may generate an output identifying a result of the comparison. In one example, first word detection module 212 is configured to perform operations such as feature extraction on the received audio data, and to store extracted features in one of buffers 214. In various embodiments, such feature extraction transforms audio data from a time domain to a frequency domain, and patters are identified in the resulting audio spectrum in the frequency domain. For example, Mel-frequency cepstral coefficients (MFCC) may be used for feature extraction. As will be discussed in greater detail below, the feature samples may be stored in a features buffer.

Low power circuit 202 may include buffers 214 that are configured to buffer received audio data. Accordingly, buffers 214 may be configured to buffer received audio data and provide such buffered audio data to first word detection module 212 when first word detection module 212 requests such data, as may occur when first word detection module 212 is triggered by speech detection module 208. As will be discussed in greater detail below, buffers 214 may include time domain and frequency domain buffers, and a size of each of buffers 214 may be configured based on requirements of first word detection module 212.

Low power circuit 202 may also include memory 210 which may be a local memory device configured to store software as well as audio data received and processed by speech detection module 208 and first word detection module 212. Accordingly, memory 210 may be configured to store software used to implement one or more modules described above when such modules are implemented as software. As discussed above, low power circuit 202 may include components configured to operate at a first power level. For example, low power circuit 202 may be implemented by using, at least in part, an Arm Cortex M33 core.

System 200 may further include high performance circuit 206 that may include processing elements and memory configured to perform verification operations and query processing operations. More specifically, high performance circuit 206 may include one or more components configured to verify the wake word detection and identification performed by low power circuit 202, and may be further configured to handle a subsequent query or command issued by a user. For example, high performance circuit 206 may include second word detection module 216 which may be configured to verify the word detection performed by first word detection module 212. Accordingly, second word detection module 216 may be configured to perform additional wake word detection operations to increase the accuracy of the wake word detection, and verify the output of first word detection module 212. In various embodiments, second word detection module 216 may be configured to perform more computationally intensive wake word detection operations than first word detection module 212. For example, first word detection module 212 may be configured to perform a rules-based comparison, while second word detection module 216 may be configured to perform a neural network-based inference. In various embodiments, first word detection module 212 may be configured to implement machine learning techniques, such as one or more neural networks. Second word detection module 216 may be configured to implement machine learning techniques, such neural networks, that utilize a larger model resulting in higher accuracy. In some embodiments, second word detection module 216 may also apply one or more digital signal processing operations, such as filtering/reduction of noise. In various embodiments, second word detection module 216 may be implemented via processor 232 and software stored in a memory, such as memory 221. In some embodiments, second word detection module 216 is implemented via dedicated processing logic, such as that included in a hardware accelerator.

High performance circuit 206 may also include speech recognition module 218 which may be configured to process subsequent audio data. For example, in response to second word detection module 216 identifying the presence of a wake word, speech recognition module 218 may be triggered to process subsequent audio data included in the received audio stream. Speech recognition module 218 may be configured to compare the received audio data with one or more designated audio patterns to identify one or more commands. In various embodiments, high performance circuit 206 is configured to use sub-acoustic pattern recognition which are stitched into words, and subsequently used to infer intent or language via word and language modeling techniques. Examples of sub-acoustic units are phonemes and graphenes. The word and/or language modeling can be implemented using n-gram and or neural networks used for natural language processing tasks. Speech recognition module 218 may also be configured to perform one or more function calls in response to the identification of such commands. For example, in response to identifying a command to turn off a set of lights in the user's home, speech recognition module 218 may transmit a request or a call to an application associated with the lights to handle the request.

As discussed above, prediction models may be used for word detection operations. More specifically, machine learning models, which may be supervised machine learning models, may be used to identify extracted patterns in feature data, and to identify words in audio data. Accordingly, such machine learning models may be generated and implemented using a learning phase and an inference phase. In some embodiments, the machine learning models may be neural networks. In various embodiments, neural networks used by low power circuit 202 may be of a lower complexity and less computationally intensive than neural networks used by high performance circuit 206. For example, word detection module 212 of low power circuit 202 may use a first neural network that has fewer neurons and/or features than a second neural network used by word detection module 216 of high performance circuit 206. In some embodiments, the first neural network may have fewer layers of neurons or connections between neurons than the second neural network. Accordingly, one or more aspects of the neural networks may be configured based on power constraints determined based on the power domain in which the neural network is implemented.

In various embodiments, speech recognition module 218 may be implemented via software stored in a memory, such as memory 221. In some embodiments, speech recognition module 218 is implemented via dedicated processing logic, such as that included in a hardware accelerator. As discussed above, high performance circuit 206 may include components configured to operate at a second power level. For example, high performance circuit 206 may be implemented by using, at least in part, an Arm Cortex M55 core.

As similarly discussed above, low power circuit 202 and high performance circuit 206 may be communicatively coupled to each other via interface 204. Accordingly, interface 204 may be configured to provide bidirectional communication between the two domains. In one example, interface 204 is an interface between a first chip used to implement low power circuit 202 and a second chip used to implement high performance circuit 206.

Figure 3:
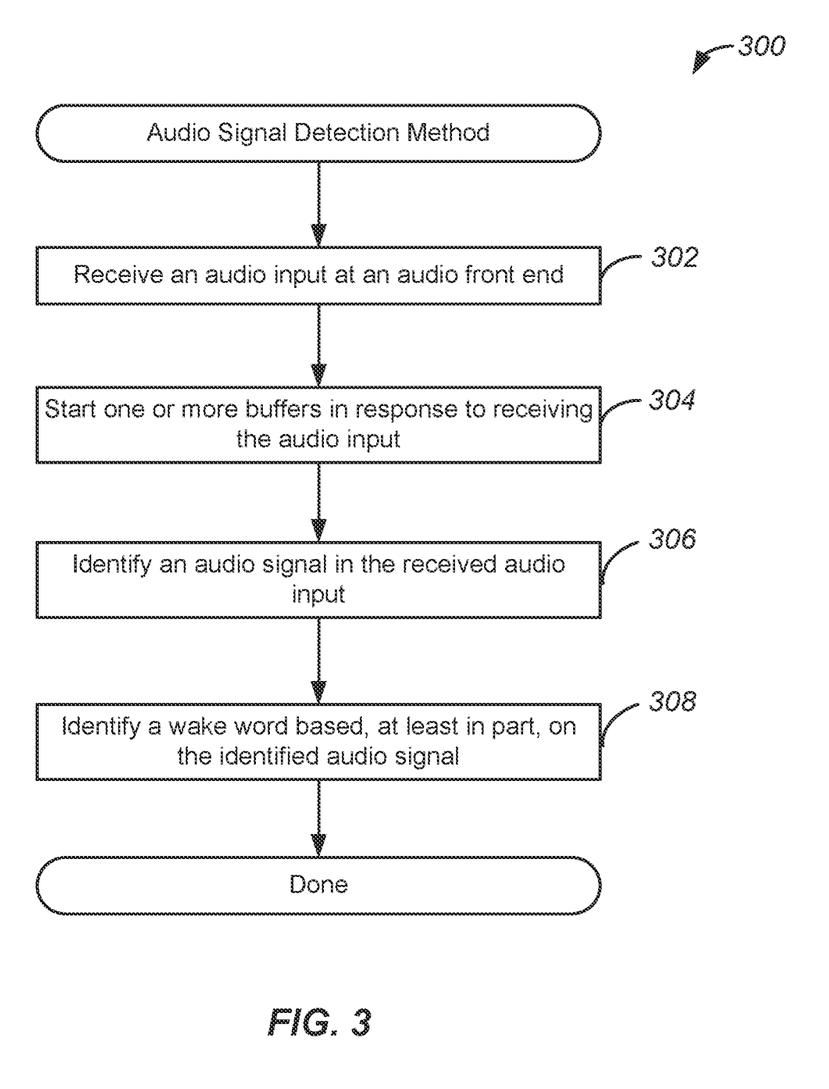
FIG. 3 illustrates a flow chart of an example of a method for audio signal detection, implemented in accordance with some embodiments.

FIG. 3 illustrates a flow chart of an example of a method for audio signal detection, implemented in accordance with some embodiments. In various embodiments, a method, such as method 300, may be performed to detect audio signals, and to detect wake words used by various appliances and devices, such as smart home devices. As will be discussed in greater detail below, method 300 may be performed to perform such wake word detection and query/command processing using low power and high performance components, as discussed above.

Method 300 may perform operation 302 during which an audio input may be received. As similarly discussed above, the audio input may be received from an environment in which a smart device or system is implemented. Accordingly, the audio input may be an audio signal received from such an environment. As also discussed above, the audio input may include voice commands and speech provided by the user.

Method 300 may perform operation 304 during which a buffer may be started. Accordingly, in response to detecting an audio signal at an audio front end, one or more buffers may be started to buffer incoming audio data. As will be discussed in greater detail below, different buffers may be triggered in response to different conditions based on one or more operational preferences. Accordingly, embodiments disclosed herein may provide buffer management that is configured to satisfy one or more designated operational preferences, such as a power management profile or a performance profile.

Method 300 may perform operation 306 during which an audio signal may be identified. Thus, according to various embodiments, the received and buffered audio data may be processed to determine if speech has been detected. Accordingly, during operation 306, it may be determined if the received audio data is non-speech data, or if the received audio data includes speech and words from a user. As similarly discussed above, such detection of speech may be performed by a low power circuit of a smart device or system.

Method 300 may perform operation 308 during which a wake word may be identified. Accordingly, in response to detecting speech received from a user, the received and buffered audio data may be processed to identify the presence of one or more wake words. As similarly discussed above, the identification of a wake word may occur in two stages where a first stage is handled by a low power circuit of a smart device or system, and where a second stage is handled by a high performance circuit of a smart device or system. Accordingly, identification and verification of the wake word may be split between the low power and high performance domains, and also used to subsequently trigger query/command processing, as also similarly discussed above.

Figure 4:
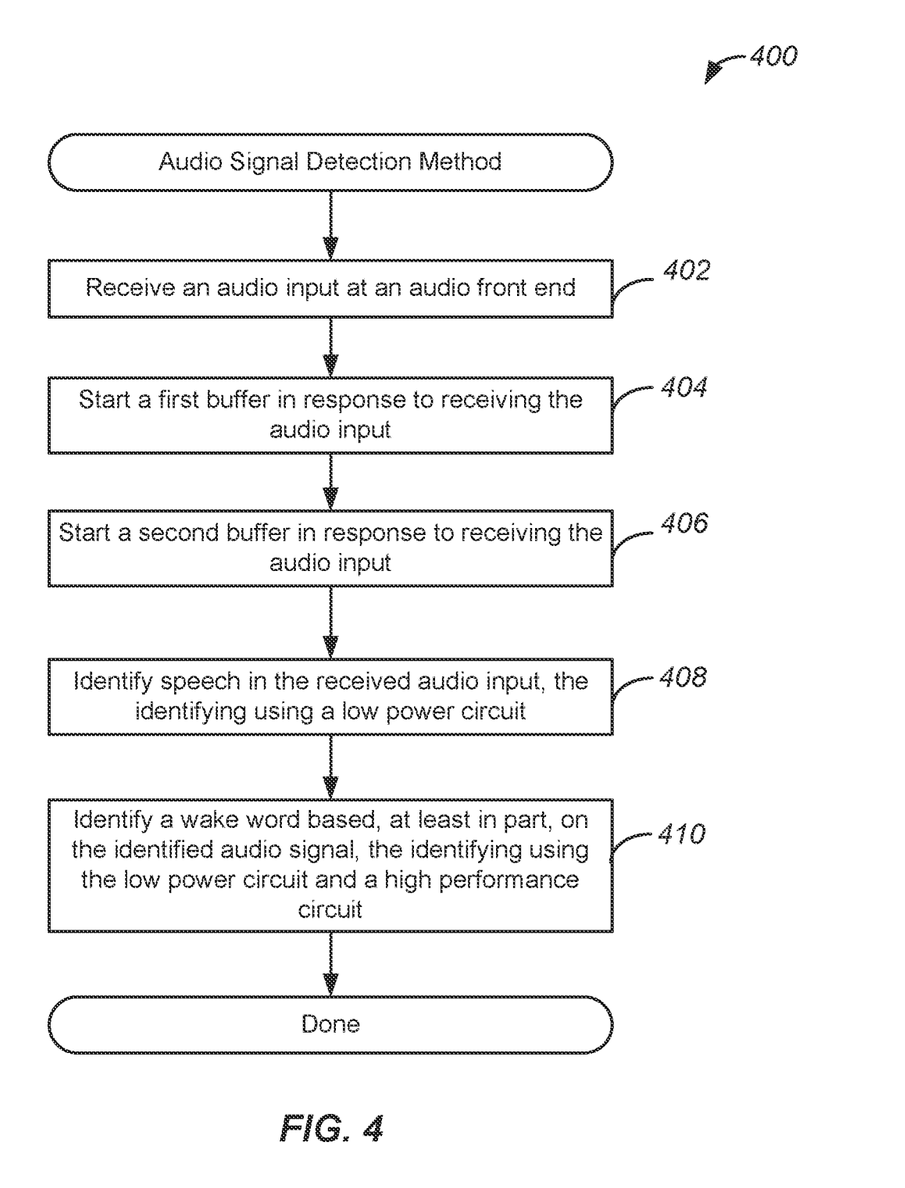
FIG. 4 illustrates a flow chart of another example of a method for audio signal detection, implemented in accordance with some embodiments.

FIG. 4 illustrates a flow chart of another example of a method for audio signal detection, implemented in accordance with some embodiments. In various embodiments, a method, such as method 400, may be performed to detect audio signals, and to detect wake words used by various appliances and devices, such as smart home devices. As similarly discussed above, such operations may be configured to satisfy one or more designated operational preferences, such as a power management profile or a performance profile. As also discussed above, such a profile may be identified or selected by a user, or based on one or more profile parameters. Accordingly, as will be discussed in greater detail below, method 400 may be performed to implement a performance profile, and increase a performance of such audio signal detection operations.

Method 400 may perform operation 402 during which an audio input may be received. As similarly discussed above, the audio input may be received from an environment in which a smart device or system is implemented. Accordingly, the audio input may be an audio signal received from such an environment. As also discussed above, the audio input may include voice commands and speech provided by the user.

Method 400 may perform operation 404 during which a first buffer may be started. In various embodiments, the first buffer may be a time domain buffer, such as a PCM buffer. In various embodiments, the first buffer is configured to buffer data used for initial audio signal detection that may occur prior to a wake word being received. In various embodiments, the first buffer is started after audio signal detection, and is used to buffer data used for speech onset detection. Accordingly, an audio signal received as an audio input may trigger the first buffer, and commence buffering of audio data. Therefore, during operation 404, a time domain buffer may start buffering received audio data.

Method 400 may perform operation 406 during which a second buffer may be started. In various embodiments, the second buffer may be a frequency domain buffer, such as a features buffer. In various embodiments, the second buffer is configured to buffer data used for wake word identification after speech has been detected. For example, as discussed above, the features buffer may store extracted features that may be used, at least in part, for wake word detection. In various embodiments, during operation 406, a frequency domain buffer may start buffering received audio data in advance of such speech being identified to reduce a latency associated with the starting of the features buffer. Accordingly, to implement a performance profile that specifies a higher performance or lower latency, the features buffer may be started with the PCM buffer to eliminate a subsequent latency when such speech is detected.

In various embodiments, such a performance profile may be identified based on a profile parameter. Accordingly, a profile parameter may determine a timing of the staring of the first and second buffer. More specifically, the profile parameter may determine whether or not the second buffer should be started in response to receiving the audio input, or whether it should be started at a later time, as will be discussed in greater detail below. In this way, the profile parameter may determine if a performance profile should be implemented, or if a low power or power management profile should be implemented. Such a profile parameter may be determined by a user or by another entity, such as a manufacturer, and the profile parameter may be set during a configuration process of the low power circuit and the high performance circuit.

Method 400 may perform operation 408 during which speech may be identified in the audio input. Thus, according to various embodiments, the received audio data may be processed to determine if speech has been detected. Accordingly, during operation 408, it may be determined if the received audio data is non-speech data, or if the received audio data includes speech and words from a user. As similarly discussed above, such detection of speech may be performed by a low power circuit of a smart device or system. In some embodiments, operation 408 may be performed responsive to determining that no wake word detection operation is being performed. Accordingly, operation 408 may be performed such that it is not triggered if a previous wake word detection operation is already underway.

Method 400 may perform operation 410 during which a wake word may be identified. Accordingly, in response to detecting speech received from a user, the received audio data may be processed to identify the presence of one or more wake words. As similarly discussed above, the identification of a wake word may occur in two stages where a first stage is handled by a low power circuit of a smart device or system, and where a second stage is handled by a high performance circuit of a smart device or system. Accordingly, identification and verification of the wake word may be split between the low power and high performance domains, and also used to subsequently trigger query/command processing, as also similarly discussed above.

Figure 5:
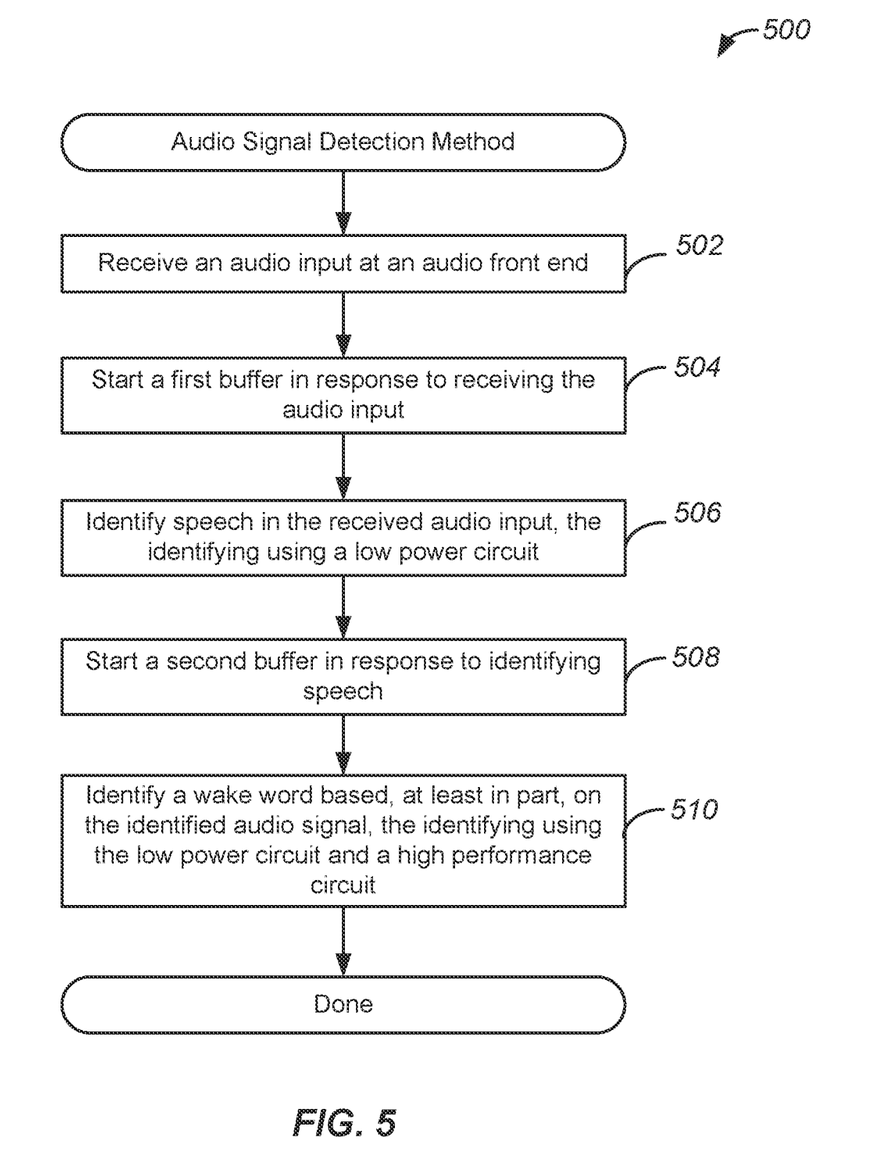
FIG. 5 illustrates a flow chart of an additional example of a method for audio signal detection, implemented in accordance with some embodiments.

FIG. 5 illustrates a flow chart of an additional example of a method for audio signal detection, implemented in accordance with some embodiments. In various embodiments, a method, such as method 500, may be performed to detect audio signals, and to detect wake words used by various appliances and devices, such as smart home devices. As similarly discussed above, such operations may be configured to satisfy one or more designated operational preferences, such as a power management profile or a performance profile. Accordingly, as will be discussed in greater detail below, method 500 may be performed to implement a power management profile, and increase a power efficiency of such audio signal detection operations.

Method 500 may perform operation 502 during which an audio input may be received. As similarly discussed above, the audio input may be received from an environment in which a smart device or system is implemented. Accordingly, the audio input may be an audio signal received from such an environment. As also discussed above, the audio input may include voice commands and speech provided by the user.

Method 500 may perform operation 504 during which a first buffer may be started. As similarly discussed above, the first buffer may be a time domain buffer, such as a PCM buffer, that may be configured to buffer data used for initial audio signal detection that may occur prior to a wake word being received. Accordingly, an audio signal received as an audio input may trigger the first buffer, and commence buffering of audio data. Therefore, during operation 504, a time domain buffer may start buffering received audio data.

Method 500 may perform operation 506 during which speech may be identified in the audio input. Thus, according to various embodiments, the received audio data may be processed to determine if speech has been detected. Accordingly, during operation 506, it may be determined if the received audio data is non-speech data, or if the received audio data includes speech and words from a user. As similarly discussed above, such detection of speech may be performed by a low power circuit of a smart device or system. In some embodiments, operation 506 may be performed responsive to determining that no wake word detection operation is being performed. Accordingly, operation 506 may be performed such that it is not triggered if a previous wake word detection operation is already underway.

Method 500 may perform operation 508 during which a second buffer may be started. As similarly discussed above, the second buffer is configured to buffer data used for wake word identification after speech has been detected. Such data may include features extracted from the audio data, as similarly discussed above. In various embodiments, during operation 508, a frequency domain buffer may start buffering received audio data in response to speech being identified during operation 506. Accordingly, the second buffer is inactive during the initial signal/noise detection, and is started in response to the identification of speech within the signal. By triggering the second buffer in response to speech being identified, activity of the second buffer is constrained to wake word detection. Accordingly, to implement a power profile that specifies a reduced power consumption, the second buffer may be started after the first buffer to reduce unnecessary power consumption by the second buffer.

Method 500 may perform operation 510 during which a wake word may be identified. Accordingly, in response to detecting speech received from a user, the received audio data may be processed to identify the presence of one or more wake words. As similarly discussed above, the identification of a wake word may occur in two stages where a first stage is handled by a low power circuit of a smart device or system, and where a second stage is handled by a high performance circuit of a smart device or system. Accordingly, identification and verification of the wake word may be split between the low power and high performance domains, and also used to subsequently trigger query/command processing, as also similarly discussed above.

In various embodiments, the verification operations performed by the high performance circuit are responsive to the frequency domain buffer becoming full. More specifically, more complex inference operations handled by the high performance circuit are performed responsive to a designated amount of data being stored in the frequency domain buffer. Thus, the high performance circuit is inactive until there is a designated amount of data stored in the frequency domain buffer becoming full. In this way, the time in which the high performance circuit is consuming power in an active state may be reduced, and a power management profile may be implemented.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   receiving an audio input at an audio front end circuit;
   starting, using a low power circuit, one or more buffers in response to receiving the audio input, the one or more buffers comprising at least a time domain buffer and a frequency domain buffer;
   identifying, using the low power circuit, speech included in the audio input; and
   identifying, using the low power circuit and a high performance circuit, a wake word based, at least in part, on the identified speech, the high performance circuit being configured to verify the wake word identified by the low power circuit.

2. The method of claim 1, wherein the identifying of the wake word further comprises:
   identifying, using the low power circuit, the wake word; and
   verifying, using the high performance circuit, the identifying of the wake word.

3. The method of claim 1, wherein the low power circuit comprises one or more processors having a first power level, and wherein the high performance circuit comprises one or more processors having a second power level.

4. The method of claim 3, wherein the second power level is greater than the first power level.

5. The method of claim 1, wherein the starting of the one or more buffers comprises:
   starting the time domain buffer in response to receiving the audio input; and starting the frequency domain buffer in response to receiving the audio input.

6. The method of claim 1, wherein the starting of the one or more buffers comprises:
starting the time domain buffer in response to receiving the audio input; and
starting the frequency domain buffer in response to identifying the speech.

7. The method of claim 6, wherein the time domain buffer is a pulse-code modulation (PCM) buffer, and wherein the frequency domain buffer is a features buffer.

8. The method of claim 1 further comprising:
identifying a profile parameter; and
determining a timing of the starting of the one or more buffers based on the profile parameter.

9. The method of claim 8, wherein the profile parameter is a performance profile parameter or a low power profile parameter.

10. A system comprising:
an audio front end circuit configured to receive an audio input;
a first circuit comprising one or more processors configured to:
start one or more buffers in response to receiving the audio input, the one or more buffers comprising at least a time domain buffer and a frequency domain buffer;
identify audio data associated with speech included in the audio input;
identify a wake word based, at least in part, on the identified speech; and
a second circuit comprising one or more processors configured to:
verify the identification of the wake word based, at least in part, on the identified speech.

11. The system of claim 10, wherein the first circuit comprises one or more processors having a first power level, wherein the second circuit comprises one or more processors having a second power level, and wherein the second power level is greater than the first power level.

12. The system of claim 11, wherein the first power level represents a first amount of power to perform the identifying of the wake word, and wherein the second power level represents a second amount of power to perform the verifying.

13. The system of claim 10, wherein the one or more processors of the first circuit are further configured to:
start the time domain buffer in response to receiving the audio input; and
start the frequency domain buffer in response to receiving the audio input.

14. The system of claim 10, wherein the one or more processors of the first circuit are further configured to:
starting the time domain buffer in response to receiving the audio input; and
starting the frequency domain buffer in response to identifying the speech.

15. The system of claim 14, wherein the time domain buffer is a PCM buffer, and wherein the frequency domain buffer is a features buffer.

16. A device comprising:
a first circuit configured to:
start one or more buffers in response to receiving an audio input, the one or more buffers comprising at least a time domain buffer and a frequency domain buffer;
identify audio data associated with speech included in the audio input;
identify a wake word based, at least in part, on the identified speech; and
a second circuit configured to:
verify the identification of the wake word based, at least in part, on the identified speech.

17. The device of claim 16, wherein the first circuit comprises one or more processors having a first power level, wherein the second circuit comprises one or more processors having a second power level, and wherein the second power level is greater than the first power level.

18. The device of claim 17, wherein first power level represents a first amount of power to perform the identifying of the wake word, and wherein the second power level represents a second amount of power to perform the verifying.

19. The device of claim 16, wherein the first circuit is further configured to:
start the time domain buffer in response to receiving the audio input; and
start the frequency domain buffer in response to receiving the audio input.

20. The device of claim 16, wherein the first circuit is further configured to:
starting the time domain buffer in response to receiving the audio input; and
starting the frequency domain buffer in response to identifying the speech.

* * * * *